3,214,359
HYDROGEN PUMPING METHOD AND
APPARATUS
Virgil L. Stout, Schenectady, and James R. Young, Rexford, N.Y., assignors to General Electric Company, a corporation of New York
Filed Dec. 11, 1961, Ser. No. 158,460
6 Claims. (Cl. 204—154)

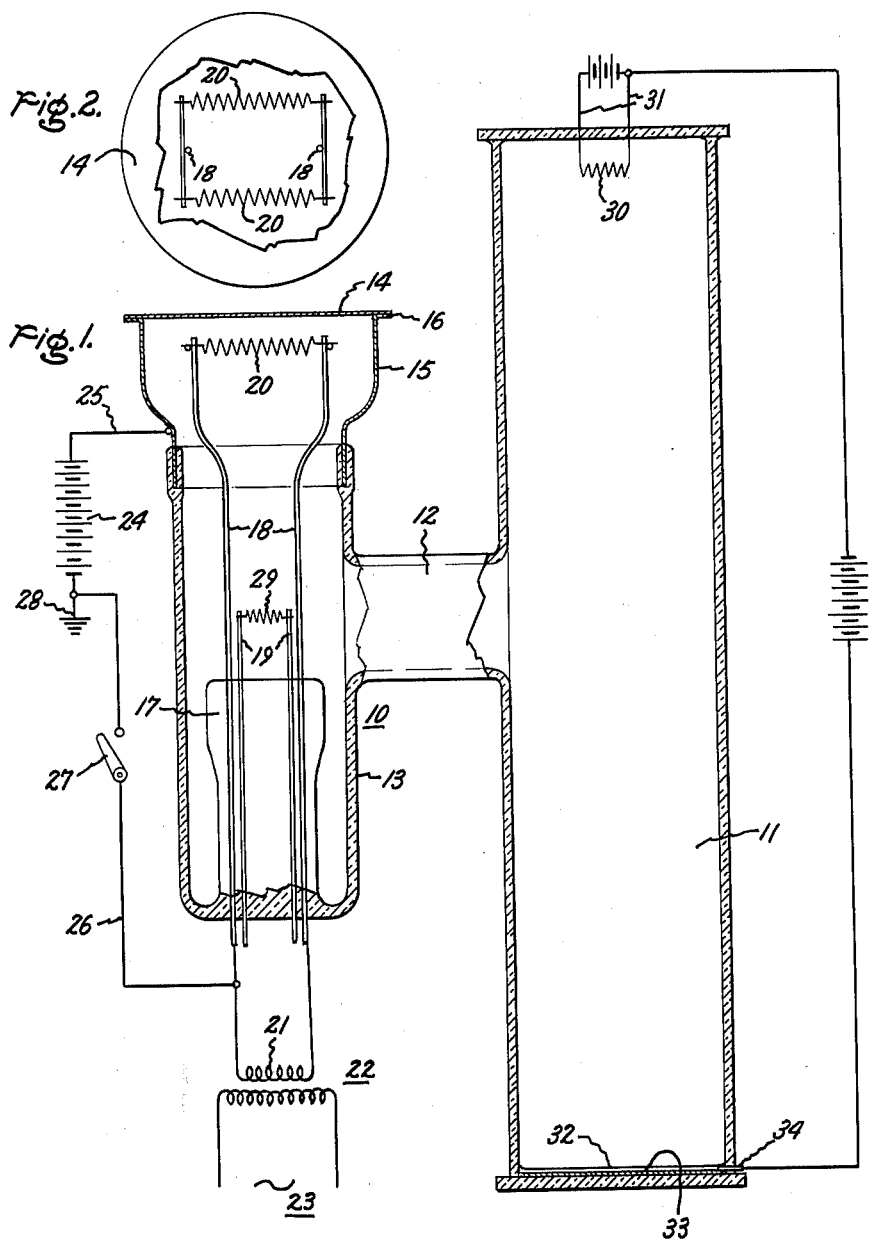

The present invention relates to an improved method and apparatus for pumping hydrogen and more particularly for pumping hydrogen from a region of lower hydrogen pressure to a region of higher hydrogen pressure.

Hydrogen permeable diaphragms such as diaphragms of palladium and alloys thereof have been employed for the transfer of hydrogen therethrough by diffusion from a region of higher to a region of lower hydrogen pressure. For example, hydrogen may be passed through the wall of an enclosure which has been previously evacuated to charge the enclosure with a quantity of hydrogen. Such a system is described and claimed or applied to the method of making hydrogen filled thyratrons in Degroat Patent 2,570,103, dated October 2, 1951. In Hunter Patent 2,773,561 dated December 11, 1956, a silver-palladium diaphragm is employed to selectively remove hydrogen from an enclosure by continually maintaining the exterior wall of the diaphragm at a lower hydrogen pressure by vacuum pumping means communicating therewith. In both of these prior applications of palladium diaphragms for the transfer of hydrogen, the transfer is accomplished from a region of higher hydrogen pressure to a region of lower hydrogen pressure by diffusion through the diaphragm.

In accordance with an important aspect of the present invention, the palladium or palladium alloy diaphragm is exposed to an oxidizing atmosphere or otherwise maintained in an oxidized condition on the side thereof subjected to the higher hydrogen pressure. The diaphragm itself, under these conditions, operates to provide a pumping function and to transfer the hydrogen from a region of lower hydrogen pressure to a region of higher hydrogen pressure.

It is accordingly an important object of the present invention to provide an improved method and apparatus for pumping hydrogen.

It is another object of the invention to provide a hydrogen permeable diaphragm which functions to transfer hydrogen from a region of lower hydrogen pressure to a region of higher hydrogen pressure.

In accordance with a preferred embodiment of the invention, a wall of an evacuated enclosure is provided with a wall portion consisting of a palladium or a palladium alloy diaphragm. A heater is provided in proximity to the inner surface of the diaphragm and the exterior of the diaphragm is exposed to the air or other oxidizing atmosphere. In use the low pressure enclosure, which may be the envelope of a projection type television picture tube employing a deformable light modulating medium (see for example Fischer Patent 2,391,450 dated December 25, 1945) is subject to increases in pressure due to the pressure of hydrogen or hydrogen containing vapors such as hydrocarbons that may be liberated by the light modulating medium. Hydrogen, methane and benzene are examples of gases that may be present. The diaphragm operates to transfer the hydrogen from the lower pressure region of the enclosure to the oxidized side of the diaphragm which is subjected to a higher hydrogen pressure. As an additional feature, the path between the heater and the diaphragm may be energized to provide electron bombardment of the hydrocarbons or other hydrogen containing gas and dissociation thereof, for example, so that the hydrogen thereof is pumped to the exterior of the enclosure.

The features and advantages which characterize the present invention will become more apparent as the following description proceeds and its scope will be pointed out in the appended claims.

In the drawing, FIG. 1 is an elevational view in section of an embodiment of our invention applied to the pumping of hydrogen from a sealed electron beam device, and FIG. 2 is a plan view partially broken away of the pump of FIG. 1.

In the embodiment of the invention illustrated in the drawing, the interior of a pumping unit 10 communicates with the interior of an evacuated enclosure 11 through a side arm 12. While the enclosure 11 may be any enclosure having hydrogen within it which it is desired to remove, it may to advantage be the envelope of an electron beam device of the type employed for projection and television pictures and employing a light modulating medium which gives off hydrogen or hydrogen containing vapors during operation. The pumping unit 10 includes a generally cylindrical hollow glass body 13 connected to and supported by the side arm 12 and closed at its upper end by a diaphragm 14 of palladium or a palladium alloy. The diaphragm is sealed to and supported by the pump body by a flared cylindrical metal member 15 which may, for example, be formed of Fernico and joined to the peripheral edge of the circular diaphragm 14 at 16 by a suitable brazing or welding method. The lower end of the pump body 13 is provided with a reentrant stem press 17 through which two pairs of spaced and mutually insulated lead-in conductors 18 and 19 are sealed. The conductors 18 support and provide electrical connections to the opposite ends of a pair of tungsten or other refractory metal filaments 20 which extend in spaced relation and in a direction generally parallel to the inner surface of the diaphragm 14. The elements 20 may be heated by supplying a suitable magnitude alternating current thereto and for this purpose the conductors 18 are energized from the secondary winding 21 of a step down transformer 22 which may be energized from a suitable alternating current supply 23.

In those instances where the hydrogen to be pumped is in the form of a hydrogen compound, the compound may be dissociated or cracked into hydrogen and its other constituents by electron bombardment. To this end the filaments 20 and the diaphragm 14 may be subjected to a suitable direct current potential. As illustrated schematically in the drawing, this potential is to be provided by a battery 24 having the positive terminal thereof connected to the diaphragm support 15 by a conductor 25 and the negative terminal thereof connected to one of the conductors 18 by conductor 26. A switch 27 may be provided in this conductor for controlling the application of the direct current voltage to the diaphragm 14 and as illustrated the negative terminal of the battery is preferably grounded as at 28.

When hydrocarbons are dissociated in the pump, the free carbon released tends to deposit on the inner surface of the palladium diaphragm. While significant amounts of carbon do not interfere with the action of the diaphragm, it will be appreciated that the cracking or dissociation may be separated from the region of the diaphragm by providing a pair of electrodes within the pump for this purpose which are shielded from the diaphragm if the presence of carbon becomes a problem.

During initial operation of the system, gases other than hydrogen may be present and in order to remove these gases from the volume of the container 11, a gas absorbing filament such as a ribbon of titanium, illustrated at 29, is provided for energization by the lead-in conductors 19.

In the drawing the electric discharge device has been illustrated schematically as including within the envelope 11 a filamentary cathode 30 supported at one end wall from suitable lead-in conductors 31 and at the other end a layer of light modulating medium 32 which is capable of deformation under the charges established by the electron beam and which has the desired resistivity to retain the charges for a period of time in the order of a raster time in television systems, for example. Such materials include oils which have a tendency to give off hydrogen and hydrocarbon vapors during electron bombardment. The light modulating medium is supported on the end of the envelope 11 which has formed on the inner surface thereof a conducting layer 33 which is connected through the envelope wall by a lead-in conductor 34. As illustrated, the conducting layer and modulating medium are maintained at a direct current voltage which may be, for example, in the order of 10 kilovolts positive with respect to the cathode. In the interest of simplification of the drawing, the electrodes for focusing and controlling the beam have been omitted, since these components of the electron beam device are not related to the present invention.

In a particular embodiment of the invention which has been constructed and tested, the diaphragm 14 is a 2" disk of 4 mil thick silver-palladium alloy having a composition of 75 percent palladium and 25 percent silver. The presence of silver tends to give stability to the physical shape of the palladium in use. The tungsten filaments 20 are approximately 1" long as in parallel provide a resistance of less than 1 ohm so that an alternating voltage in the order of 6 or 7 volts is effective to pass a total current of 8 or 9 amperes through the heater elements 20. This energization of the heater elements with the center line thereof spaced approximately ¼ inch from the diaphragm 14 is effective to heat the diaphragm to a temperature in the order of 500° C. at the center and approximately 200° C. to 250° C. at the periphery. A more uniform temperature distribution may be obtained by the design of the heater and the diaphragm support.

Where hydrocarbon vapor, for example, is being pumped and it is desired to dissociate the hydrocarbon into its constituent hydrogen and carbon, 150 volts positive are applied to the diaphragm 14 and the negative terminal connected with one end of the heater element. This energization is effective to pass about a 50 milliampere current between the filament 20 and the diaphragm 14 and to dissociate the hydrocarbon vapor.

As an indication of the pumping capabilities of the pump of the illustrated embodiment described above, some examples of operation will be given. With the inlet of the pump connected to an enclosure which has previously been evacuated, a volume of hydrogen was admitted and the pump operated to reduce the hydrogen pressure within the enclosure. When the pressure had been reduced to approximately $2 \times 10^{-6}$ millimeters of mercury, a pumping speed of 4 liters per second (the hydrogen volume is measured at room temperature and the pressure existing in the enclosure). Continued operation of the pump reduced the pressure in the container to $2 \times 10^{-8}$ millimeters of mercury in a period of several minutes.

In another use of the pump, the inlet thereof was connected with an enclosure of the type illustrated in the drawing and with the oil (light modulating medium) bombarded with an electron beam at approximately 10 kilovolts and with a beam current of 1–3 microamperes. Operation of the pump maintained pressures within the enclosure at levels of $2 \times 10^{-6}$ to $6 \times 10^{-6}$ millimeters of mercury over periods of several hundred hours.

From the foregoing description, it is apparent that the present invention provides a new apparatus and method for pumping hydrogen from a region of relatively low hydrogen pressure to a region of higher hydrogen pressure through a diaphragm of palladium or palladium alloy having the high pressure side thereof oxidized. The alloy such as a silver alloy lends physical stability to the diaphragm during use without detracting to any significant degree from the ability of the diaphragm to pass the hydrogen. Accordingly, it is intended in this specification and in the appended claims that the expression "palladium diaphragm" be construed to designate a diaphragm either exclusively of palladium or alloyed with other materials such as silver, where the alloy retains the hydrogen diffusing properties of palladium and the alloying metal serves to modify some other characteristic of palladium such as its physical stability. Also, the word "diaphragm" designates a thin wall regardless of shape and includes, for example, a thin walled cylinder as well as the flat diaphragm disclosed in the illustrated embodiment. It will also be apparent that the specific embodiment of the invention may be altered considerably without departing from the broader aspects of the present invention. For example, the diaphragm may be constructed as a window directly in the side wall of the enclosure from which the hydrogen is to be pumped.

What we claim as new and desire to secure by Letters Patent of the United States is:

1. The method of pumping hydrogen from an enclosure at a pressure in the order of $10^{-6}$ mm. of mercury to a higher hydrogen pressure on the exterior of the enclosure which comprises subjecting one surface of a palladium diaphragm at elevated temperature to the region of low hydrogen pressure while subjecting the surface thereof exposed to the higher hydrogen pressure to an oxidizing atmosphere.

2. The method of pumping hydrogen from an enclosure at a pressure in the order of $10^{-6}$ mm. of mercury to a higher hydrogen pressure on the exterior of the enclosure which comprises subjecting one surface of a palladium diaphragm at elevated temperature to the region of low hydrogen pressure while maintaining the surface thereof exposed to the higher hydrogen pressure in an oxidized condition.

3. The method of removing hydrogen from an enclosure adapted to be maintained at a low pressure and including a supply of hydrocarbon vapor which comprises subjecting one surface of a palladium diaphragm to the interior of said enclosure, maintaining said diaphragm at an elevated temperature, exposing the opposite surface of said diaphragm to an oxidizing atmosphere, and dissociating said vapors into hydrogen and carbon in the region of said diaphragm to effect the removal of hydrogen from said hydrocarbon vapors through said diaphragm and maintain the interior of said enclosure at a pressure in the order of $10^{-6}$ mm. of mercury.

4. Apparatus for removing hydrogen from an enclosure to be maintained at a low hydrogen pressure to a region of higher hydrogen pressure on the exterior of said enclosure, said enclosure having a supply of gaseous hydrogen compound therein, comprising a palladium diaphragm separating the interior of said enclosure from said region of higher pressure, heating means within the enclosure in closely spaced relation to said diaphragm for heating said diaphragm and means within said apparatus for subjecting hydrogen containing gaseous compound therein to electron bombardment to release the hydrogen therefrom.

5. Apparatus for removing hydrogen from an enclosure to be maintained at a low hydrogen pressure to a region of higher hydrogen pressure on the exterior of said enclosure, said enclosure including a source of hydrocarbon vapors, comprising a palladium diaphragm separating the interior of said enclosure from said region of higher pressure, heating means within the enclosure in closely spaced relation to said diaphragm for heating said diaphragm and means for impressing a direct current voltage between said diaphragm and said heating means for subjecting the hydrocarbon vapors therein to electron bombardment to release the hydrogen therefrom.

6. Apparatus for removing hydrogen from an enclosure to be maintained at low pressure and having therein a source of hydrocarbon vapor comprising a generally cylindrical envelope having an opening therein for communication with the enclosure, a palladium diaphragm closing one end of said envelope, an electrode within said envelope spaced from said diaphragm and providing a source of electrons, and means impressing a voltage between said electrode and said diaphragm to bombard said diaphragm with electrons to heat said diaphragm and to dissociate said hydrocarbon vapor to release hydrogen therefrom so that the hydrogen of the hydrocarbon vapor is removed from the enclosure through said diaphragm.

References Cited by the Examiner
UNITED STATES PATENTS

| | | | |
|---|---|---|---|
| 1,174,631 | 3/16 | Snelling | 55—158 |
| 2,028,014 | 1/36 | Reinecke | 204—170 |
| 2,553,944 | 5/51 | Schlesman | 204—170 |
| 2,727,167 | 12/55 | Alpert | 313—7 |
| 2,773,561 | 12/56 | Hunter | 55—16 |
| 2,921,006 | 1/60 | Schmitz et al. | 204—154 |

JOHN H. MACK, *Primary Examiner.*

MURRAY TILLMAN, WINSTON A. DOUGLAS,
*Examiners.*